(12) United States Patent
Kubota et al.

(10) Patent No.: US 6,198,870 B1
(45) Date of Patent: Mar. 6, 2001

(54) OPTICAL WAVEGUIDE AND 1.5 μM-BAND OPTICAL AMPLIFIER USING SAME

(75) Inventors: Yoshinori Kubota; Natsuya Nishimura, both of Yamaguchi (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 08/972,944

(22) Filed: Nov. 18, 1997

(30) Foreign Application Priority Data

Nov. 19, 1996 (JP) .................................................. 8-308260
Mar. 25, 1997 (JP) .................................................. 9-070948

(51) Int. Cl.[7] ............................. H01S 3/067; G02B 6/16
(52) U.S. Cl. ................... 385/142; 385/144; 359/341; 372/6
(58) Field of Search ................................ 385/142, 144, 385/24; 359/341; 372/69, 40, 6; 501/37

(56) References Cited

U.S. PATENT DOCUMENTS

| | | | |
|---|---|---|---|
| Re. 36,515 | * 1/2000 | Aitken et al. | 385/144 |
| 3,731,226 | * 5/1973 | Snitzer et al. | 372/40 |
| 4,044,315 | 8/1977 | Snitzer | 372/40 |
| 4,081,761 | * 3/1978 | Melamed et al. | 372/68 |
| 4,347,485 | * 8/1982 | Esterowitz et al. | 372/42 |
| 4,668,641 | * 5/1987 | Tick | 501/37 |
| 4,770,811 | 9/1988 | Myers | 252/301.4 P |
| 4,962,067 | 10/1990 | Myers | 501/45 |
| 4,962,995 | * 10/1990 | Andrews et al. | 359/341 |
| 5,050,949 | * 9/1991 | DiGiovanni et al. | 359/341 |
| 5,206,925 | * 4/1993 | Nakazawa et al. | 385/142 |
| 5,240,885 | * 8/1993 | Aitken et al. | 501/40 |
| 5,245,690 | * 9/1993 | Aida et al. | 385/142 |
| 5,309,452 | * 5/1994 | Ohishi et al. | 372/6 |
| 5,373,526 | * 12/1994 | Lam et al. | 372/69 |

(List continued on next page.)

FOREIGN PATENT DOCUMENTS 0 534 045 A1    3/1993 (EP) .
8-222784A       8/1996 (JP) .

OTHER PUBLICATIONS

Y.G. Choi et al., "Enhanced 41 11/2 to 41 13/2 transition rate in Er3+ / Ce3+ codoped tellurite glasses", Electronics Letters, vol. 35, No. 20, pp. 1765–1767, Sep. 1999.*

Yu et al., Special characteristics of Er(3 +)–activated and Ce(3 +)–sensitized yttrium aluminium garnet laser crystals. J. Alloys and Compounds 217 (1995), 148–150, Jan. 1995.*

"$Yb^{3+}$ energy transfer and rate–equations formalism in the eye safe laser material $Yb:Er:Ca_2Al_2SiO_7$" B. Simondi–Teisseire, B. Viana, D. Vivien, A.M. Lejus, Optical Materials 6(1996) 267–274—(Nov.).

"Spectroscopic Investigation of the ER3+ Fluroescence Transitions at 540 NM and 1.5 M in Fluoride Phosphate and Phosphate Glasses" Ebendorff–Heidepriem H et al, Glastenchnische Berichte, vol. 66, No. 9, Sep. 1, 1993, pp. 235–244, XP000397565.

* cited by examiner

Primary Examiner—John D. Lee
Assistant Examiner—Michael J Stahl
(74) Attorney, Agent, or Firm—Evenson, McKeown, Edwards & Lenahan, P.L.L.C.

(57) ABSTRACT

The invention relates to an optical waveguide having a core made of one member selected from halide glasses, chalcogenide glasses and oxyhalide glasses. This one member is doped with both of erbium and cerium. The invention further relates to a 1.5 μm-band optical amplifier having the optical waveguide for amplifying the light. Due to the doping of both erbium and cerium, it becomes possible to provide a highly efficient optical amplifier having low noise and wide band. With this, it becomes possible to construct an optical communication network having high credibility, high capacity and high speed.

18 Claims, 8 Drawing Sheets

U.S. PATENT DOCUMENTS

| | | | | |
|---|---|---|---|---|
| 5,379,149 | * | 1/1995 | Snitzer et al. | 359/341 |
| 5,392,376 | * | 2/1995 | Aitken et al. | 385/144 |
| 5,537,505 | * | 7/1996 | Borrelli et al. | 385/142 |
| 5,563,979 | * | 10/1996 | Bruce et al. | 385/142 |
| 5,598,491 | * | 1/1997 | Ohya et al. | 385/24 |
| 5,668,659 | | 9/1997 | Sakamoto et al. | 359/341 |
| 5,764,661 | * | 6/1998 | Tawarayama et al. | 372/6 |
| 5,936,762 | * | 8/1999 | Samson et al. | 359/341 |
| 5,955,388 | * | 9/1999 | Dejneka | 501/3 |

OPTICAL WAVEGUIDE AND 1.5 µM-BAND OPTICAL AMPLIFIER USING SAME

BACKGROUND OF THE INVENTION

The present invention relates to an optical waveguide and a 1.5 µm-band optical amplifier in which the optical waveguide is used.

Hitherto, the light amplifying silica glass fiber containing an activation ion of Er has been used in the optical amplifier for amplifying 1.5 µm optical signals. Thus, this glass fiber has played an important role in making the optical communication high-speed. In such optical amplifier, the Er ions can be excited by a pump light having a wavelength of 1.48 µm or 0.98 µm. As a result, the light emission of 1.5 µm-band can be obtained through the stimulated emission transition of $^4I_{13/2} \rightarrow {}^4I_{15/2}$, as shown in FIG. 1. It is known that an optical amplifier using the excitation at 0.98 µm has a lower noise than that of another optical amplifier using the excitation at 1.48 µm. In recent years, the wavelength multiplex communication system has drawn much attention in the course of the increase of the communication capacity. Thus, it has been required to get a light amplifying medium which can achieve an effective light amplification in a wide band. In view of this, there have been recent studies on the widening of the band of Er-doped silica fibers and on Er-doped halide glasses and Er-doped chalcogenide glasses. It is known that an optical waveguide and an optical fiber used therefor, which are made of Er-doped halide glass, Er-doped chalcogenide glass or oxyhalide glass glasses are expected to become a light amplifying medium used for the 1.5 µm -band wavelength multiplex communication. However, if the Er ions contained in these glasses are excited at 0.98 µm in an optical amplifier, the excited state absorption (ESA) of the Er ions tends to occur, as shown in FIG. 1. The reason of this is that the phonon energy of halide glass, chalcogenide glass or oxyhalide glass is lower than that of oxide glass. With this, the chance of the occurrence of the multiphonon relaxation of the Er ions by the transition of $^4I_{11/12} \rightarrow {}^4I_{13/2}$ becomes small, and thus the fluorescent life time becomes long in the $^4i_{11/12}$ level. As a result, the ESA loss of the Er ions increases, and thus the amount of the pump energy directed to the stimulated emission at 1.5 µm-band is decreased. With this, the amplification efficiency is lowered. Thus, it has been impossible to prepare an optical amplifier having low noise and wide band by using halide glass, chalcogenide glass or oxyhalide glass. In order to prepare such optical amplifier, it becomes necessary to shorten the fluorescent life time of the Er ions in the $^4I_{11/12}$ level, In view of this, Japanese Patent Unexamined Publication No. 8-222784 discloses a light amplifying fiber containing in its core both of a first dopant of Er and a second dopant which is at least one selected from Tb, Dy and Eu. However, this second dopant may absorb the pump light and/or the signal light and thus decrease the amplification efficiency, in case that the absorption wavelength is varied by the effect of the host material composition, or that the second dopant is added in large amount.

SUMMARY OF THE INVENTION

It is an object of the present invention to provide a 1.5 µm-band optical amplifier having an optical waveguide having an Er-doped core made of halide glass, chalcogenide glass or oxyhalide glass, which amplifier has an effective light amplification by the excitation at 0.98 µm-band.

It is another object of the present invention to provide such optical waveguide.

According to the present invention, there is provided an optical waveguide comprising a core made of one member selected from the group consisting of halide glasses, chalcogenide glasses and oxyhalide glasses, The one member is doped with both of erbium (Er) and cerium (Ce).

According to the present invention, there is further provided a 1.5 µm-band optical amplifier comprising:

(a) a pump light source for producing a pump light;

(b) an optical multiplexer for combining said pump light with a signal light, to produce a combined light;

(c) the above optical waveguide for amplifying said signal light by receiving said combined light; and (d) an optical isolator for suppressing a noise caused by a reflected light.

According to the present invention, the core of the optical waveguide is doped with both of erbium and cerium. With this, the ESA of the Er ions is effectively suppressed even in a particular glass (halide glass, chalcogenide glass or oxyhalide glass) having a low phonon energy. Therefore, it becomes possible to provide a highly efficient optical amplifier having low noise and wide band. With This, it becomes possible to construct an optical communication network having high credibility, high capacity and high speed.

DESCRIPTION OF THE PREFERRED EMBODIMENTS

Figure 1:
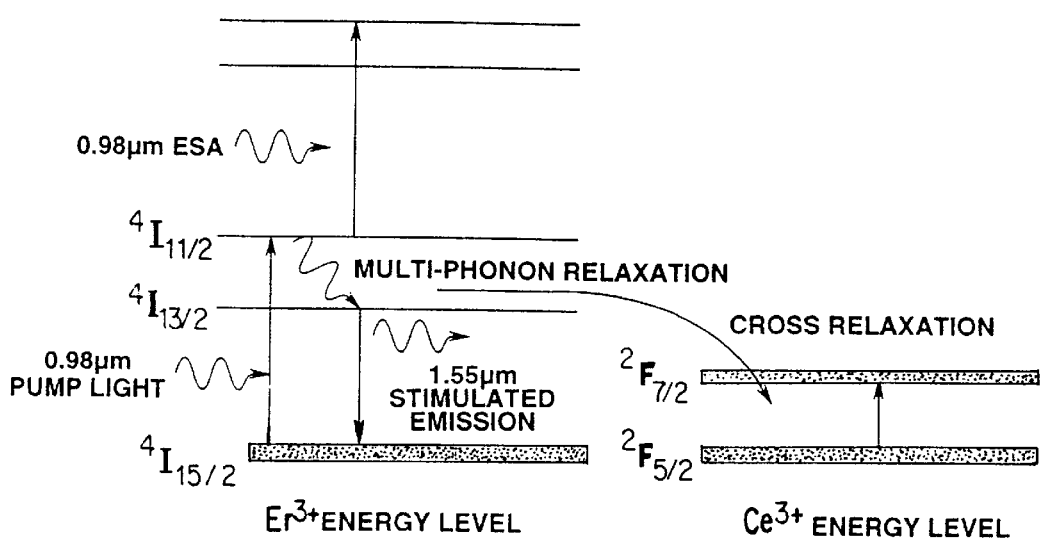
FIG. 1 is a diagram showing the energy levels of Er and Ce ions.
Figure 2:
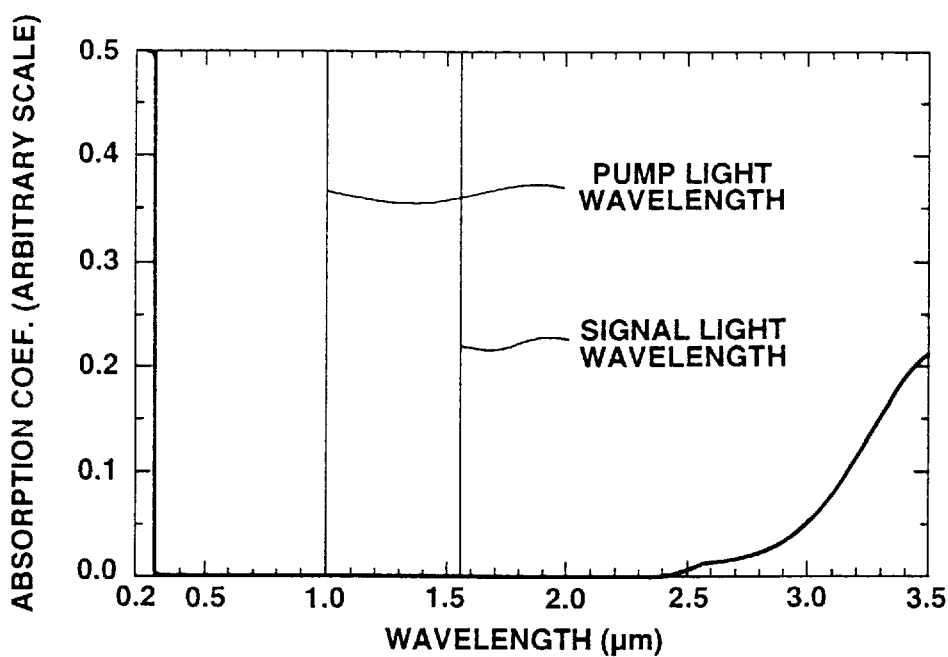
FIG. 2 is a graph showing the absorption spectrum of the Ce ions.
Figure 3:
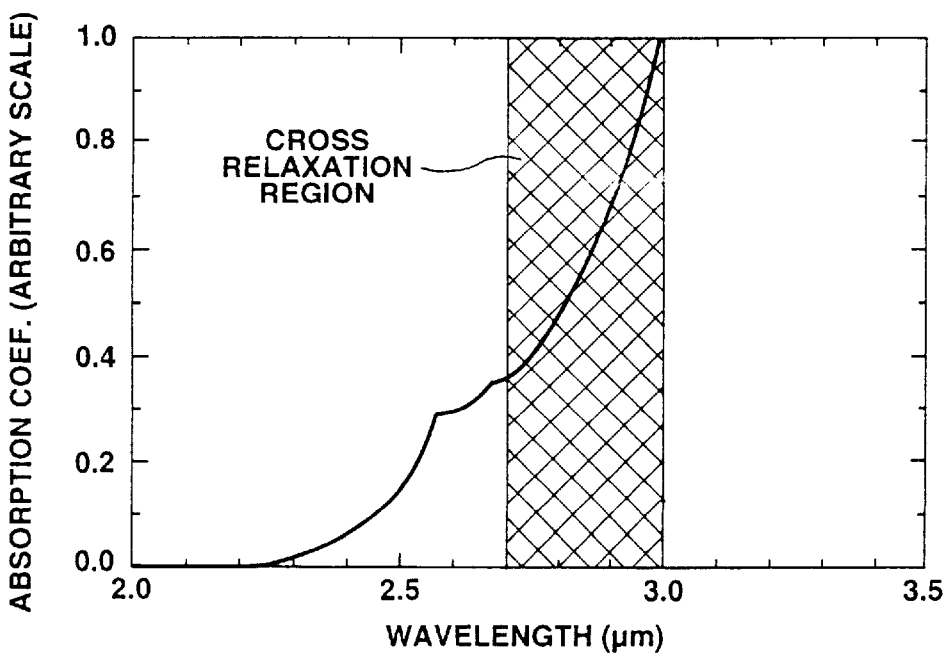
FIG. 3 is a graph that is an enlargement of FIG. 2.

As mentioned hereinabove, it is necessary to shorten the fluorescent life time of the Er ions in the $^4I_{11/12}$ level in order to suppress the ESA of the Er ions excited at 0.98 µm (see FIG. 1). As stated above, an optical waveguide according to the present invention has a core made of one member selected from halide glasses, chalcogenide glasses and oxyhalide glasses. This core is doped with both of Er an Ce. An absorption band of the Ce from 2.7 µm to 3.0 µm (see FIG. 3) corresponds to the transition energy difference of the Er ions between $^4I_{11/12}$ and $^4I_{13/2}$. Thus, there occurs a cross relaxation between the Er ions and the Ce ions. With this, it becomes possible to shorten the fluorescent life time of the Er ions in the $^4I_{11/12}$. FIGS. 2 and 3 show the absorption spectrum of Ce ion. As shown in FIG. 2, Ce ion is transparent to light within a wavelength range form 0.3 to 2.5 $\mu$m. Therefore, Ce ion never absorbs each of the pump light of 0.98 $\mu$m and the signal light of 1.55 $\mu$m. Thus, it is possible to add a large amount of Ce ions to the core. With this, the distance between an Er atom and an adjacent Ce atom becomes shorter, and thus the rate of occurrence of the cross relaxation is increased.

In the invention, it is preferable that the core of the optical waveguide contains 0.01–10 wt % of Er. If it is outside this range, it may become difficult to obtain satisfactory light amplification. It is preferable that the core of the optical waveguide contains 0.01–30 wt % of Ce. If it is less than 0.01 wt %, the advantageous effect of the addition of Ce may become insufficient. If it is greater than 30 wt %, the crystallization of Ce in the core may occur. It is optional to add a sensitizer (e.g., Yb, Ho and/or Nd) into the core in order to more effectively utilize the pump light. The process of the cross relaxation between the Er ions and the Ce ions is not adversely affected by the addition of the sensitizer.

In the invention, preferable examples of the halide glasses used as the host material of the core are fluoride glasses, chloride glasses, and chlorine-containing fluoride glasses. Preferable examples of the chalcogenide glasses used as the same are sulfide glasses, selenide glasses, telluride glasses, selenium-containing sulfide glasses, tellurium-containing sulfide glasses, and tellurium-containing selenide glasses. Preferable examples of the oxyhalide glasses used as the same are fluorophophate glasses, fluorine-containing silicate glasses, fluorine-containing germanate glasses, and fluorine-containing aluminate glasses.

In the invention, the light amplifying optical waveguide of the 1.5 $\mu$m-band optical amplifier may be an optical fiber or a planar optical waveguide. In the invention, the pump light source used for the optical amplifier is not particularly limited, as long as it produces a pump light of 0.98 $\mu$m-band laser beam. As the pump light source it is preferable to use a semiconductor laser (pigtailed semiconductor laser) which is connected with an optical fiber by means of lens. p In the invention, the method for exciting the Er ions of the core of the optical waveguide is not particularly limited, as long as the excitation is effectively conducted. For example, the Er ions may be excited by forward excitation, backward, excitation, or bidirectional excitation. It is optional to use only one laser device or at least tow laser devices for the excitation. It is effective in the invention to use a laser device having a wide oscillation wavelength band. Such laser device can be obtained by combining at least two laser devices having slightly different oscillation wavelengths or by using stimulated Raman scattering.

In the invention, it is necessary to provide an optical multiplexer for combining the pump light with signal light. The thus combined light is transmitted into the optical waveguide. The optical multiplexer may also be used as a demultiplexer, depending on the direction of the light which is transmitted therethrough. The optical multiplexer is not limited to a particular type, as long as the insertion loss is small and it is possible to obtain an effective multiplex system. A preferable example of such optical multiplexer is a wavelength division multiplexer (WDM). Furthermore, it is preferable to use an optical multiplexer made by parts of optical fiber and/or planer waveguide. It becomes possible to decrease the insertion loss and the size of the optical amplifier by using an optical multiplexer having a built-in optical isolator.

In the invention, the optical isolator is not limited to a particular type, as long as it sufficiently suppressed a reflected light and the insertion loss is small. It is preferable to incorporate the optical isolator into another optical device (e.g., optical multiplexer), as mentioned above, in order to make the optical amplifier small in size.

In the invention, it is preferable to make the optical amplifier have the gain monitoring and gain equalizing functions, in order to improve reliability of the optical communication system. These functions may be incorporated into or attached with the optical amplifier. The method for monitoring the gain is not limited to a particular one, as long as the input signal light intensity can substantially be compared with the output signal light intensity. In conducting the wavelength multiplex communications by using an optical amplifier of the invention, it is preferable to monitor and equalize the gain for each signal assigned to the corresponding wavelength. The gain equalizing function may be performed in a passive or active way. A system using an optical filter is an easy way for performing the passive gain equalizing function. The active gain equalizing function is a combination of the gain monitoring function and the feedback function and is not limited to a particular one, as long as the input signal light intensity can substantially be compared with the output signal light intensity and then the gain can be equalized. Furthermore, the optical amplifier may have the output equalizing function for making the output signal light intensity constant. This function is also effective in improving reliability of the optical communication system. It is preferable to make these functions automatically adjustable, for example, by using a microprocessor which is programmable by remote operation.

The following nonlimitative examples are illustrative of the present invention.

EXAMPLE 1

At first, there was prepared a fluoride glass fiber having a core having a basic chemical composition of 51 mol % $ZrF_4$, 19 mol % $BaF_2$, 4.5 mol % $LaF_3$, 2 mol % $YF_8$, 2 mol % $AlF_3$, 13.5 mol % LiF, and 8 mol % $PbF_2$, and a cladding surrounding the core and having a basic chemical composition of 40 mol % $HfF_b$, 10 mol % $ZrF_4$, 19 mol % $BaF_2$, 3 mol % $LaF_3$, 2 mol % $YF_3$, 4 mol % $AlF_3$, and 22 mol % NaF. This core contained 0.1 wt % of Er and 0.5 wt % of Ce, each of which had been substituted for La contained therein. This fluoride glass fiber had a specific refraction index difference of 3.3% and a cutoff wavelength of 1.0 $\mu$m.

Figure 4:
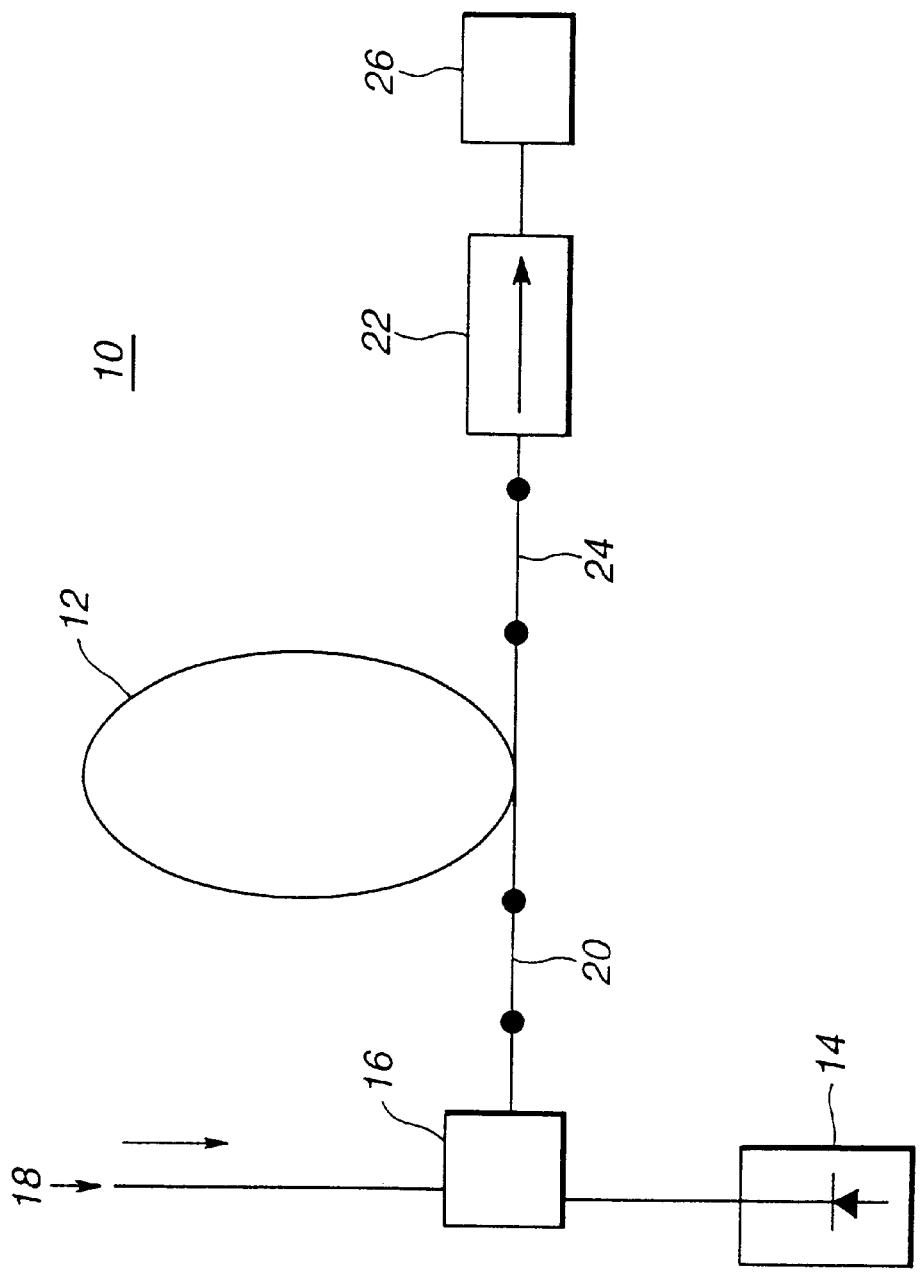
FIG. 4 is a schematic diagram showing a 1.5 µm-band optical amplifier according to the present invention.

Then, as shown in FIG. 4, a 1.5 $\mu$m-band optical amplifier 10 was prepared using the above fluoride glass fiber 12 having a length of 10 m . Aside form the fluoride glass fiber 12, the optical amplifier 10 had a semiconductor laser 14 which had a fiber pigtail and was used as the pump light source for producing a pump light, an optical multiplexer 16 for combining the pump light with a 1.55 $\mu$m-band signal light 18, a high N.A. silica fiber 20 for connecting the optical multiplexer 16 with the fluoride glass fiber 12 used as a light amplifying optical waveguide, an optical isolator 22 for suppressing a noise caused by the reflected light, another high N.A. silica fiber 24 for connecting the fluoride glass fiber 12 with the optical isolator 22, and a measuring device 26. The silica fiber 20 was brought into connection with the fluoride glass fiber 12 at first by subjecting the end surfaces fo these fibers 20 and 12 to an oblique optical polishing and then by attaching these end surfaces with each other by an optical adhesive, using a V-grooved block. This oblique optical polishing was conducted to decrease the reflection loss. The silica fiber 24 was also brought into connection with the fluoride glass fiber 12 in the same manner as this.

Figure 5:
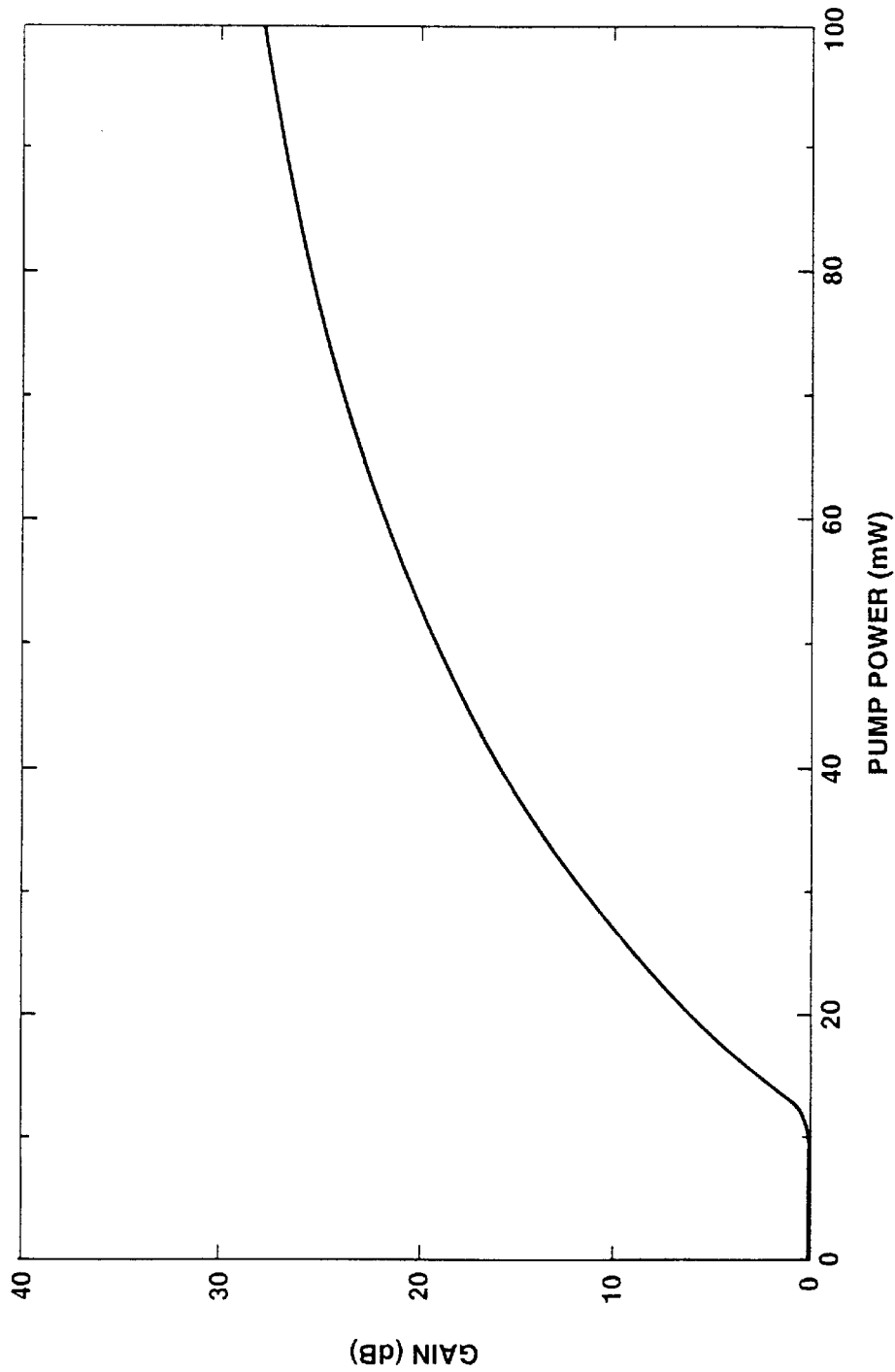
FIG. 5 is a graph showing the dependence of gain on the pump power of a 1.5 µm-band optical amplifier according to the present invention.
Figure 6:
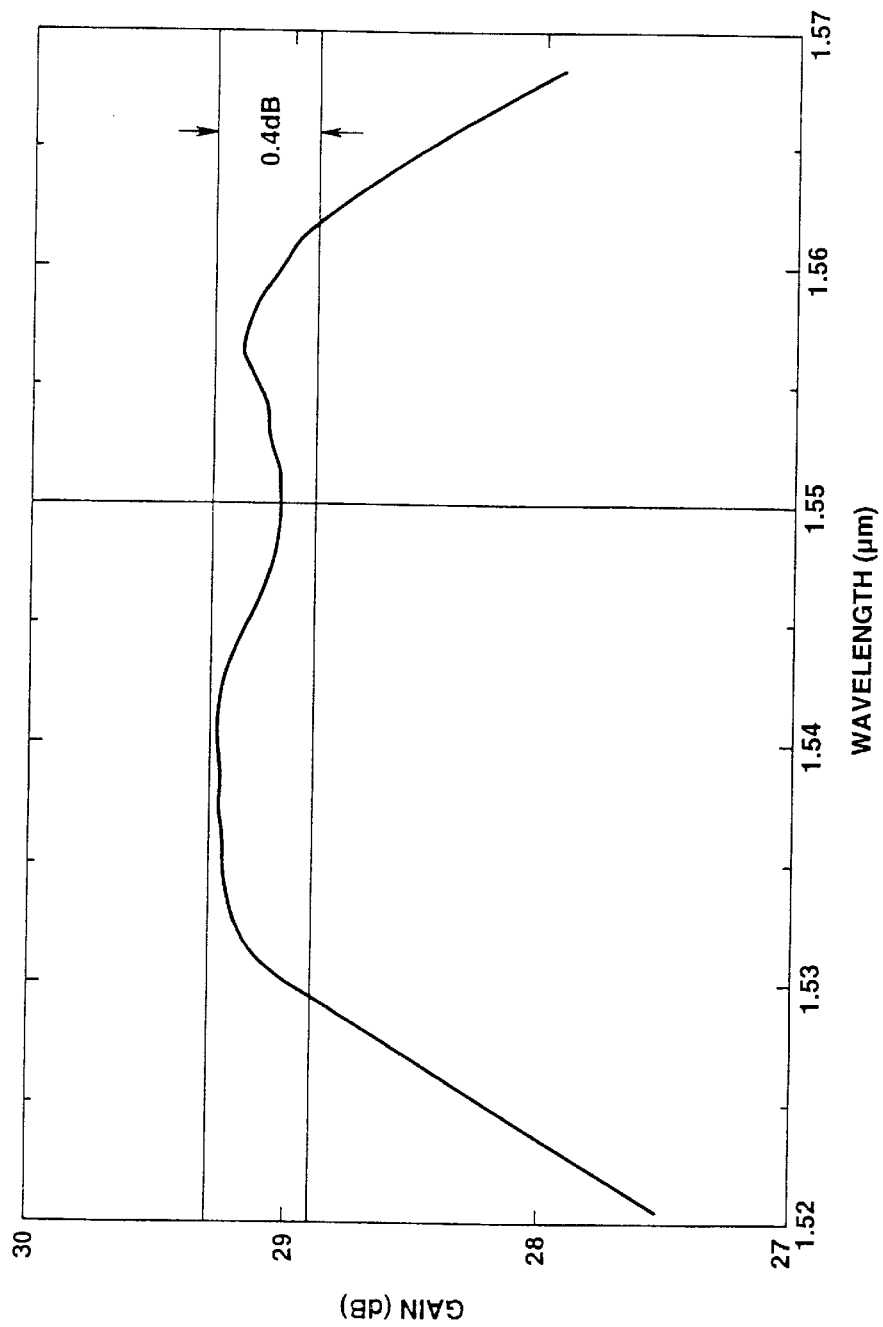
FIG. 6 is a graph showing the dependence of gain on the signal light wavelength of a 1.5 µm-band optical amplifier according to the present invention.
Figure 7:
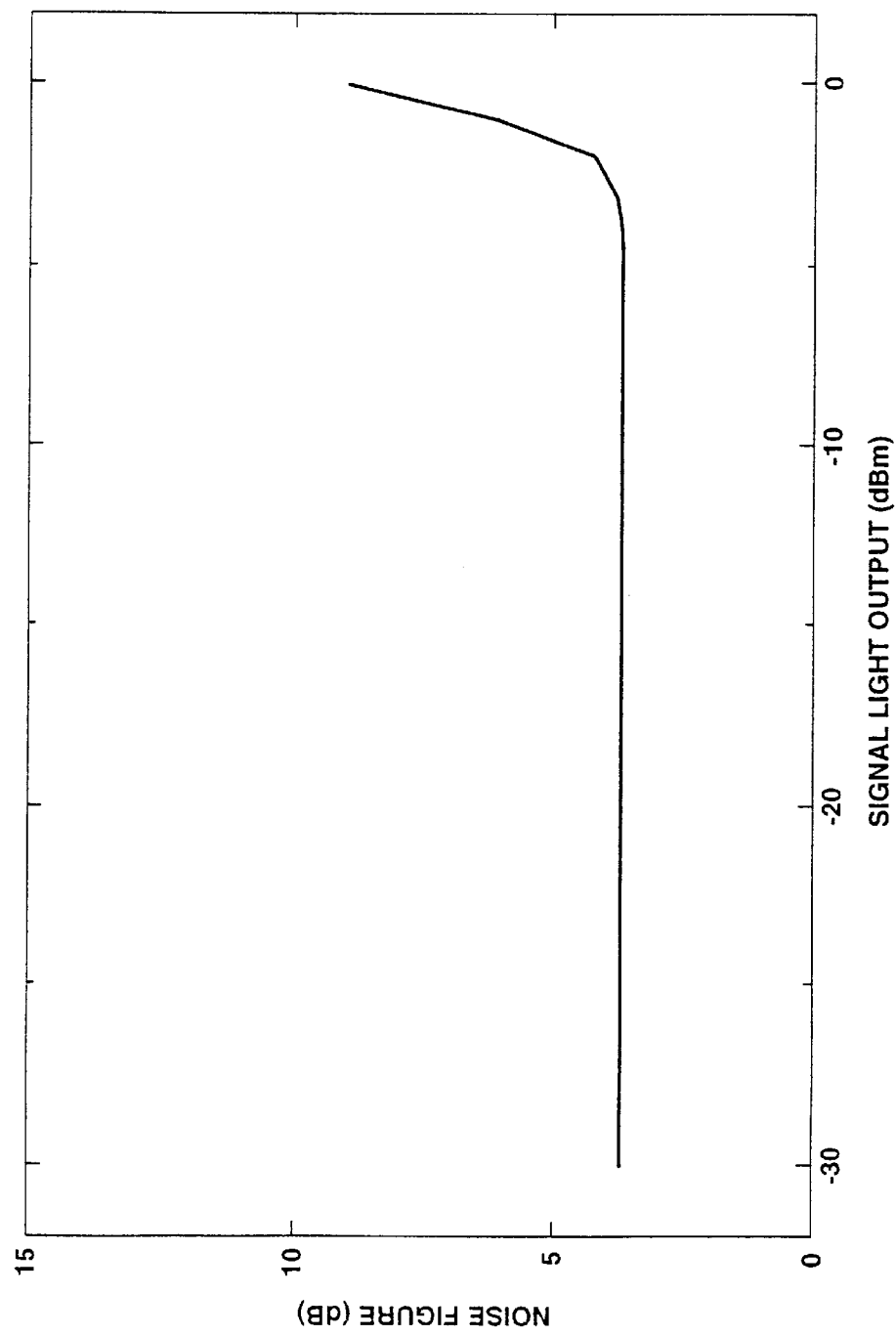
FIG. 7 is a graph showing the dependence of noise figure on the signal light output from a 1.5 µm-band optical amplifier according to the present invention.

In the optical amplifier 10, the signal light 18 from the optical multiplexer 16 was amplified by the fluoride glass fiber 12, then allowed to go through the optical isolator 22, and then detected by the measuring device 26. Using this measuring device 26, there was determined the small signal gain, the gain spectrum, and the noise figure characteristic of the amplifier 10. The results of the small signal gain, the gain spectrum, and the noise figure characteristic of the amplifier 10 are respectively shown in FIGS. 5,6, an 7. As shown in FIG. 5, when the pump light intensity at 0.98 µm was 100 mW, there was obtained a gain of 29 dB at a signal light wavelength of 1.55 µm. As shown in FIG. 6, when the pump light intensity at 0.98 µm was 100 mW, the gain fluctuation form 1.530 µm to 1.562 µm was in a range of 0.4 dB (±0.2 dB). That is, there was obtained a flatness of 0.4 dB (±0.2 dB) within a wide wavelength range of from 1.530 µm to 1.562 µm. Within this wavelength range, the noise figure was 3.7 dB, as shown in FIG. 7

COMPARATIVE EXAMPLE 1

In this comparative example, Example 1 repeated except in that a dopant of Ce was omitted from the core of the fluoride glass fiber 12, In other words, the core contained 0.1 wt % of a dopant of Er substituted for La contained therein. The obtained fluoride glass fiber had a specific refraction index difference of 3.3% and a cutoff wavelength of 1.0 µm.

Figure 8:
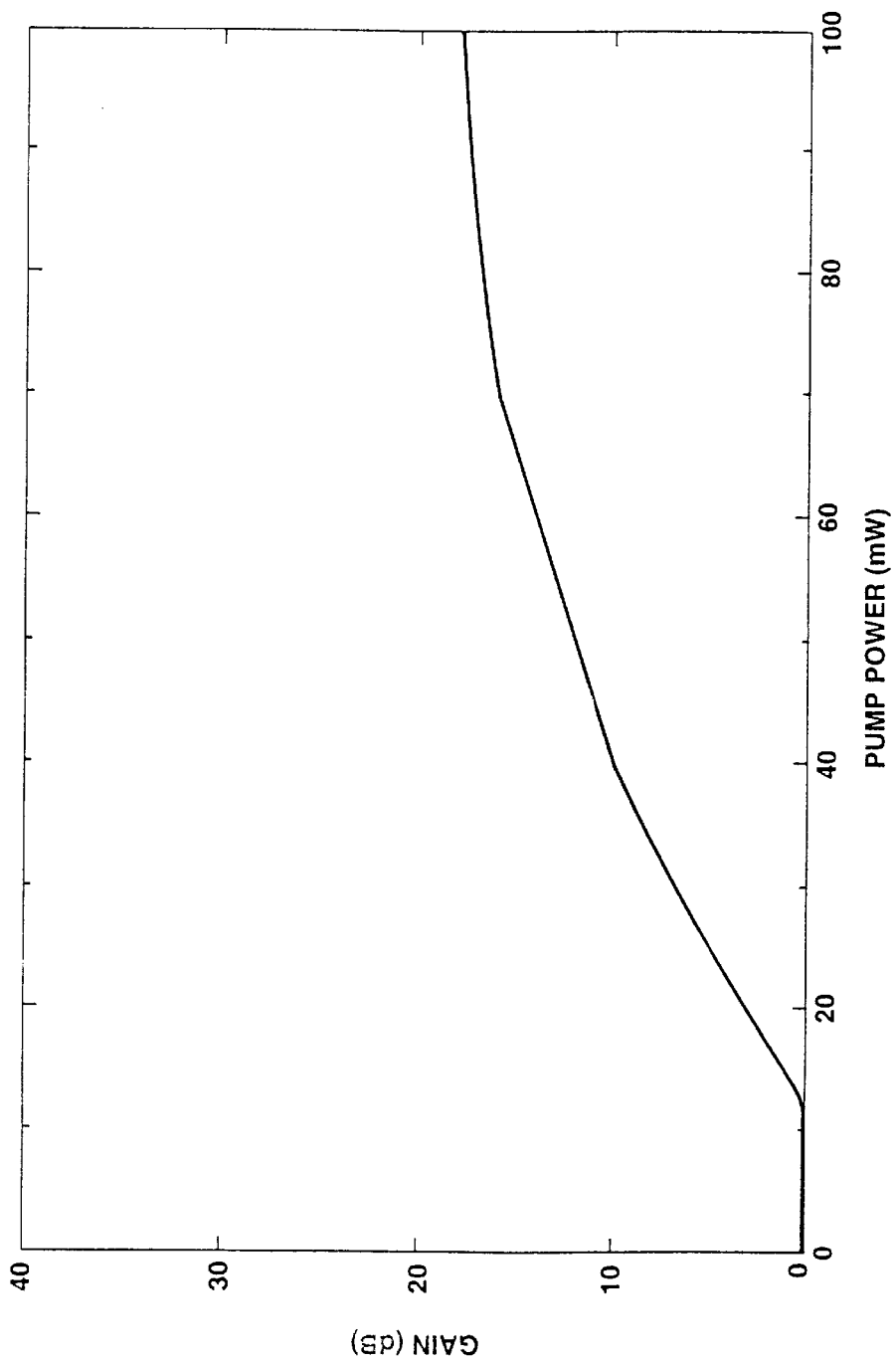
FIG. 8 is a graph similar to FIG. 5, but showing the dependence of gain on the pump power of a 1.5 µm-band optical amplifier not according to the present invention.
Figure 9:
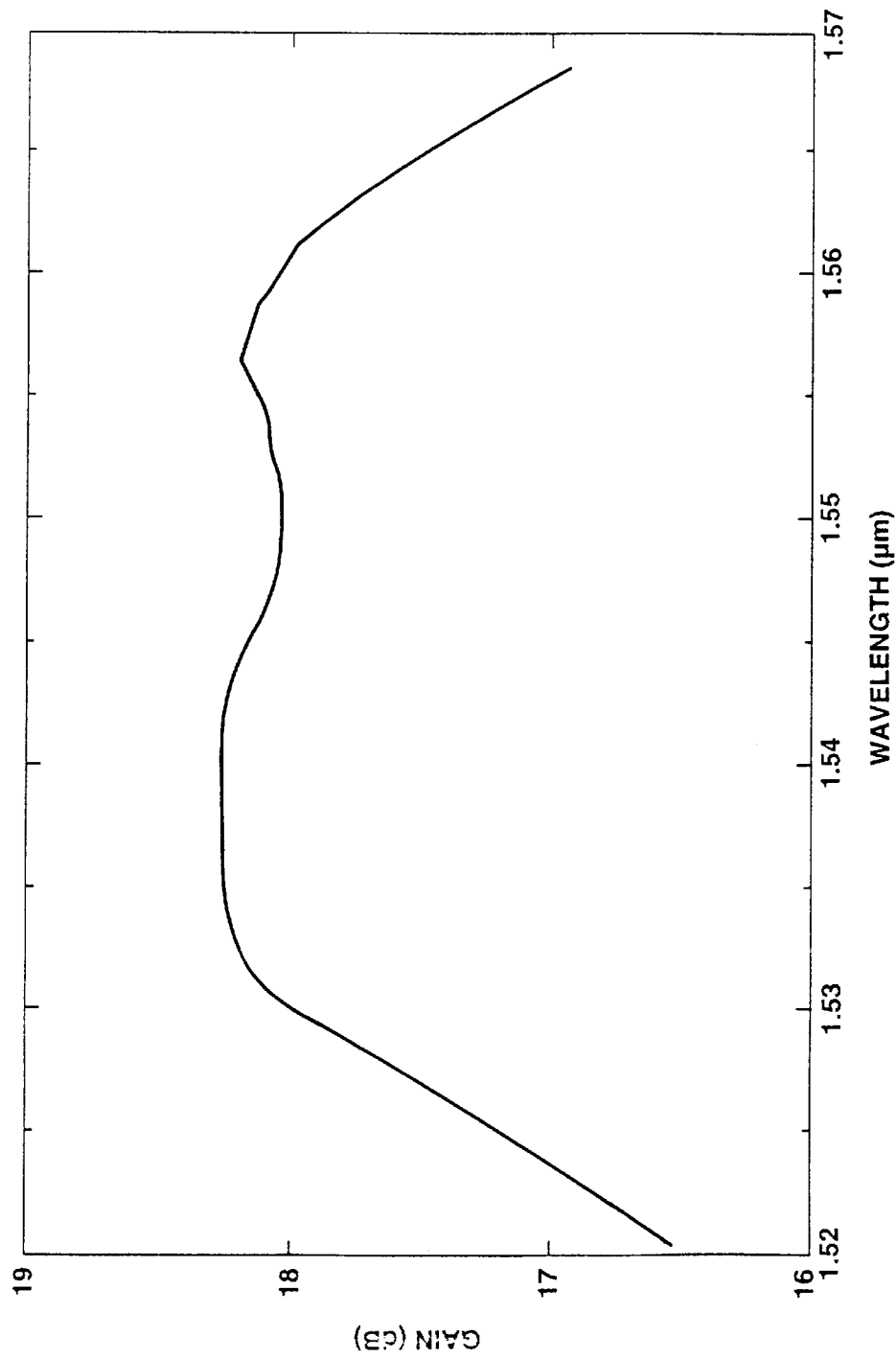
FIG. 9 is a graph similar to FIG. 6, but showing the dependence of gain on the signal light wavelength of a 1.5 µm-band optical amplifier not according to the present invention.

The results of the small signal gain and the gain spectrum are respectively shown in FIGS, 8 and 9. As shown in FIG. 8, when the pump light intensity at 0.98 µm was 100 mW, there was obtained a gain of only 18 dB at a signal light wavelength of 1.55 µm. As shown in FIG. 9, when the pump light intensity at 0.98 µm was 100 mW, the gain fluctuation from 1.530 µm to 1.562 µm was exactly the same as that shown in FIG. 6 of Example 1. This means that the amplification band width was not adversely affected by the addition of Ce. In comparison between the result of the small signal gain of Comparative Example 1 and that of Example 1, it is concluded that the small signal gain was improved by 11 dB due to the doping of both Er and Ce.

EXAMPLE 2

At first, a planar optical waveguide was written on a glass plate having a basic chemical composition which is the same as that of the cladding of the fluoride glass fiber of Example 1, by using a high repetition femtosecond laser. This glass plate contained 1 wt % of Er and 1 wt % of Ce, each of which was substituted for La contained therein. This optical waveguide had a specific refraction index difference of 0.8%, a cutoff wavelength of 0.9 µm, and a waveguide length of 20 cm. An optical amplifier was prepared in the same manner as that of Example 1, except in that the high N.A. silica fiber was replaced with a silica fiber. The planar optical waveguide was brought into connection with the silica fiber at first by subjecting the end surfaces of the optical waveguide and the silica fiber to an oblique polishing and then by attaching these end surfaces with each other, using an optical adhesive. The silica fiber and the optical waveguide were positioned relative to each other, in a manner to obtain the maximum signal light transmittance, by using a stage equipped with a fine movement adjuster.

The amplification characteristics of the optical amplifier were similar to those of Example 1. In fact, when the pump light intensity at 0.98 µm was 100 mW, there was obtained a gain of 22 dB at a signal light wavelength of 1.55 µm. Furthermore, when the pump light intensity at 0.98 µm was 100 mW, the gain fluctuation from 1.585 µm to 1.56 µm was within a range of 0.4 dB (±0.2 dB). Within this wavelength range, the noise figure was 3.8 dB.

COMPARATIVE EXAMPLE 2

In this comparative example, Example 2 was repeated except in that a dopant of Ce was omitted from the glass plate. The obtained planar optical waveguide had a specific refraction index difference of 0.8%, a cutoff wavelength of 0.9 µm, and a waveguide length of 20 cm.

The amplification characteristics of the optical amplifier were similar to those of Example 1. In fact, when the pump light intensity at 0.98 µm was 100 mW, there was obtained a gain of 17 dB at a signal light wavelength of 1.55 µm. Furthermore, the noise figure was 4.2 dB.

EXAMPLE 3

At first, there was prepared a fluoride/fluorophosphate glass fiber having a core having a basic chemical composition of 18 mol % $InF_3$, 12 mol % $GaF_3$, 20 mol % $ZnF_2$, 30 mol % $BaF_2$, 10 mol % $GdF_3$, and 10 mol % $LuF_3$, and a cladding surrounding the core and having a basic chemical composition of 12 mol % $Al(PO_3)_3$, 11.1 mol % $AlF_3$, 36.6 mol % RF, and 40.3 mol % $MF_2$ wherein R represents Li and Na, and M represent Mg, Ca, Sr and Ba. This core contained 0.1 wt % of Er and 1 wt % of Ce, each of which has been substituted for Gd contained therein. The obtained glass fiber had a specific refraction index difference of 1.9% and a cutoff wavelength of 1.35 µm.

Then, a 1.5 µm-band optical amplifier was prepared in the same manner as that of Example 1, by using the obtained glass fiber having a length of 10 m, to determine the small signal gain and the noise figure characteristic of the optical amplifier, When the pump light intensity at 0.98 µm was 100 mW, there was obtained a gain of 26 dB at a signal light wavelength of 1.55 µm. Within this wavelength range, the noise figure was 3.7 dB.

COMPARATIVE EXAMPLE 3

In this comparative example, Example 3 was repeated except in that a dopant of Ce was omitted form the core. The obtained glass fiber had a specific refraction index difference of 1.9% and a cutoff wavelength of 1.35 µm, and a glass fiber length of 10 m.

When the pump light intensity at 0.98 µm was 100 mW, there was obtained a gain of 18.5 dB at a signal light wavelength of 1.55 µm. Within this wavelength range, the noise figure was 4.2 dB.

EXAMPLE 4

At first, there was prepared a chalcogenide/fluorophosphate planar optical waveguide having a core having a basic chemical composition of 30 mol % $In_2S_3$, 40 mol % $Ga_2F_3$, and 30 mol % $La_2S_3$, and a cladding having a basic chemical composition of 12 mol % $Al(PO_3)_3$, 11 mol % $Alf_3$, 30.5 mol % $RF_2$, and 46.5 mol % $MF_2$ wherein R represents Mg and Ca, and M represent Sr and Ba. This core contained 1 wt % of Er and 3 wt % of Ce, each of which has been substituted for La contained therein. The obtained optical waveguide had a specific refraction index difference of 3% and a cutoff wavelength of 1.45 µm.

Then, a 1.5 µm-band optical amplifier was prepared in the same manner as that of Example 2, by using the obtained optical waveguide having a length of 20 cm, to determine the small signal gain and the noise figure characteristic of the optical amplifier. When the pump light intensity at 0.98 µm was 100 mW, there was obtained a gain of 25 dB at a signal light wavelength of 1.55 µm. Within this wavelength range, the noise figure was 4.0 dB.

COMPARATIVE EXAMPLE 4

In this comparative example, Example 4 was repeated except in that a dopant of Ce was omitted from the core. The obtained planar optical waveguide had a specific refraction index difference of 3% and a cutoff wavelength of 1.45 µm, and a waveguide length of 20 cm.

When the pump light intensity at 0.98 µm was 100 mW, there was obtained a gain of 16 dB at a signal light wavelength of 1.55 µm. Within this wavelength range, the noise figure was 4.6 dB.

The entire disclosure of each of Japanese Patent Application Nos. 8-308260 filed on Nov. 19, 1996 and 9-70948 filed on Mar. 25, 1997, including specification claims, summary and drawings, is incorporated herein by reference in its entirety.

What is claimed is:

1. An amplifying optical waveguide comprising:
a core made of one member selected from the low portion energy glass group consisting of halide glasses, chalcogenide glasses and oxyhalide glasses, said one member being doped with both of erbium and cerium.

2. A waveguide according to claim 1, wherein said halide glasses are fluoride glasses, chloride glasses, or chlorine-containing fluoride glasses.

3. A waveguide according to claim 2, wherein said halide glasses are said fluoride glasses.

4. A waveguide according to claim 1, wherein said chalcogenide glasses are sulfide glasses, selenide glasses, telluride glasses, selenium-containing sulfide glasses, tellurium-containing sulfide glasses, or tellurium-containing selenide glasses.

5. A waveguide according to claim 4, wherein said chalcogenide glasses are said sulfide glasses.

6. A waveguide according to claim 1, wherein said oxyhalide glasses are fluorophosphate glasses, fluorine-containing silicate glasses, fluorine-containing germanate glasses, or fluorine-containing aluminate glasses.

7. A waveguide according to claim 6, wherein said oxyhalide glasses are said fluorophosphate glasses.

8. A waveguide according to claim 1, wherein said one member contains 0.01–10 wt % of said erbium and 0.01–30 wt % of said cerium.

9. A waveguide according to claim 1, wherein said one member further contains a sensitizer.

10. A waveguide according to claim 9, wherein said sensitizer is at least one member selected form the group consisting of Yb, Ho and Nd.

11. A 1.5 µm-band optical amplifier comprising:
(a) a pump light source for producing a pump light;
(b) an optical multiplexer for combining said pump light with a signal light, to produce a combined light;
(c) a light amplifying optical waveguide for amplifying said signal light by receiving said combined light, said light amplifying optical waveguide comprising a core made of one member selected from the low phonon energy glass group consisting of halide glasses, chalcogenide glasses and oxyhalide glasses, said one member being doped with both of erbium and cerium; and
(d) an optical isolator for suppressing a noise caused by a reflected light.

12. An amplifier according to claim 11, wherein said light amplifying optical waveguide is an optical fiber having a cladding surrounding said core of said light amplifying optical waveguide.

13. An amplifier according to claim 11, wherein said light amplifying optical waveguide is a planar optical waveguide.

14. An amplifier according to claim 11, wherein said pump light source is a 0.98 µm-band laser.

15. An amplifier according to claim 14, wherein said 0.98 µm-band laser is a semiconductor laser.

16. An amplifier according to claim 11, wherein said optical multiplexer is a wavelength division multiplex device.

17. An amplifier according to claim 11, further comprising at least one of a first means for monitoring a gain and a second means for equalizing said gain.

18. An amplifier according to claim 17, wherein said second means comprises an optical filter.

* * * * *

UNITED STATES PATENT AND TRADEMARK OFFICE
CERTIFICATE OF CORRECTION

PATENT NO.    : 6,198,870 B1                                    Page 1 of 1
DATED         : March 6, 2001
INVENTOR(S)   : Yoshinori Kubota et al.

It is certified that error appears in the above-identified patent and that said Letters Patent is hereby corrected as shown below:

<u>Claim 1,</u>
Line 2, the word "portion" should read -- phonon --.

Signed and Sealed this

Twenty-sixth Day of March, 2002

Attest:

Attesting Officer

JAMES E. ROGAN
*Director of the United States Patent and Trademark Office*